April 20, 1965 G. H. LOCKWOOD 3,178,858
APPARATUS FOR HONING AN ANNULAR SURFACE
Filed Dec. 26, 1962
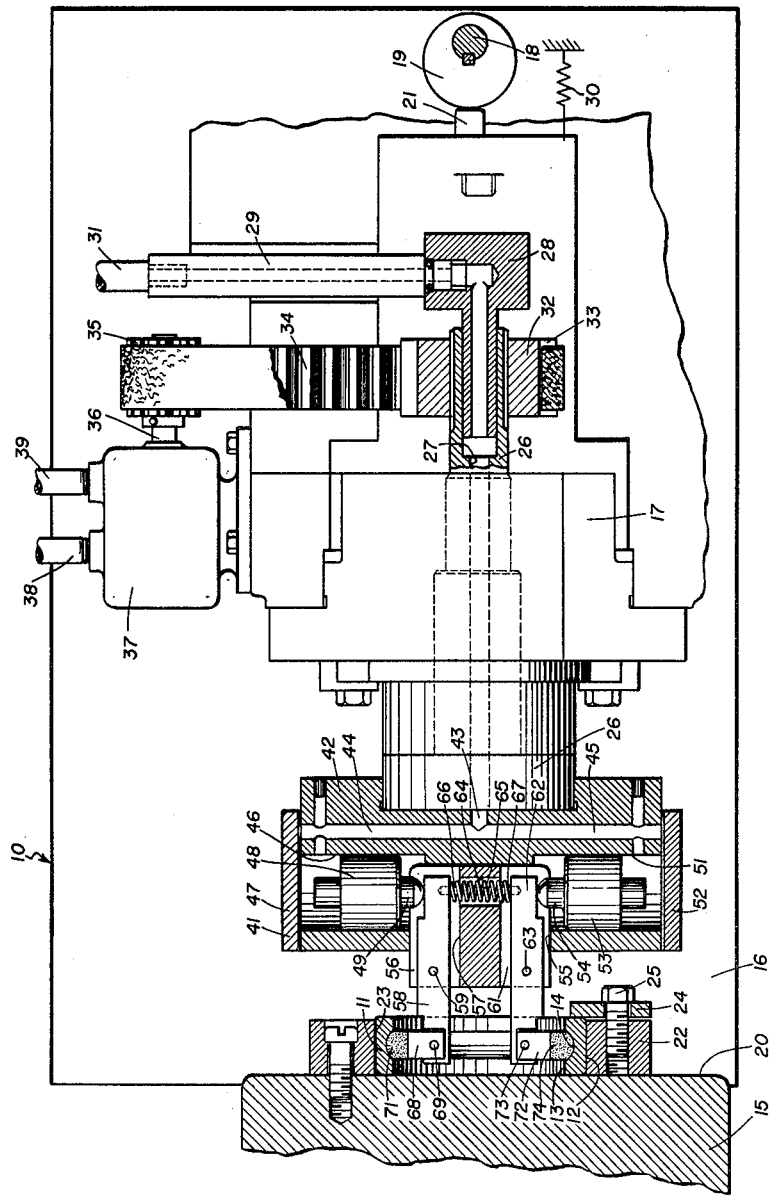
GEORGE H. LOCKWOOD
INVENTOR.
BY
Norman S. Blodgett United States Patent Office 3,178,858
Patented Apr. 20, 1965

3,178,858
APPARATUS FOR HONING AN ANNULAR SURFACE
George H. Lockwood, Worcester, Mass., assignor to The Heald Machine Company, Worcester, Mass., a corporation of Delaware
Filed Dec. 26, 1962, Ser. No. 247,094
4 Claims. (Cl. 51—33)

This invention relates to a method and apparatus for honing an annular surface and, more particularly, to a process for polishing a surface of revolution of a workpiece and an apparatus for carrying out the process.

In the manufacture of metal articles, it is common practice to polish certain surfaces by the honing method. This involves bringing a formed stone of fine abrasive quality into pressure contact with the surface to be finished. More usually, the stone is subject to a regular geometric motion relative to the surface to be finished. An example of such an operation is in the finishing of the groove of the race of a ball bearing. One of the difficulties in the honing methods and apparatus of the past is that the errors in the surface which supports the workpiece are reproduced on the surface to be finished by the honing stone. Furthermore, in clamping the workpiece in a chuck and rotating it relative to the honing stone, the workpiece is often distorted; then, when the workpiece is taken out of the chuck after the operation is finished, the finished surface does not have the desired true geometric shape. Furthermore, in the known apparatus, the rotatable chuck which carries the workpiece does not rotate concentrically because of the error introduced by the fact that it is mounted in bearings which, as a practical matter, are not perfectly made. At other times difficulty is experienced because the rotative axis of the chuck is not coaxial with the honing stone tool. These and other difficulties experienced with the prior are methods and devices have been obviated in a novel manner by the present invention.

It is, therefore, an outstanding object of the invention to provide an apparatus for honing an annular surface wherein errors on other surfaces of the workpiece are not reproduced on the annular surface and the workpiece is not distorted during the honing operation.

Another object of this invention is the provision of an apparatus for honing an annular surface in the workpiece which is simple in construction, inexpensive to manufacture, and which is capable of a long life of useful service with a minimum of maintenance problems.

A further object of the present invention is the provision of an apparatus for honing an annular surface, making use of a novel system for mutating the stone to generate the desired geometric shape in the finished surface.

It is another object of the instant invention to provide an apparatus for honing an annular surface which is capable of operation and regulation by automatic means.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawing in which:

The single figure is a somewhat schematic, plan view of apparatus embodying the principles of the present invention with portions broken away to facilitate understanding.

The apparatus, indicated generally by the reference numeral 10, is shown in operation with a workpiece 11 which is shown as the outer race of a ball bearing, having a cylindrical outer surface 12, an internal bore 13, and an annular surface 14 which, for the purposes of illustration, is shown as having the surface formed by the rotation of a circular segment about the axis of the bore 13.

The apparatus 10 consists of a workhead 15, which is mounted at one end of a base 16, and a toolhead 17, which is mounted at the other end of the base 16 but which is slidable longitudinally thereof on ways (not shown). A rotatable shaft 18 is mounted vertically in the base 16 and has keyed thereto a cam 19 of slight eccentricity which engages a cam follower 21 at the outer end of the toolhead 17 to subject it to reciprocation as the shaft 18 rotates. A suitable means, such as a spring 30, biases the toolhead 17 into contact with the cam 19 at all times.

Mounted on a vertical surface 20 of the workhead 15 is a workholder 22 in the form of an annulus bolted thereto and having a horizontal cylindrical bore 23 which is only slightly larger in diameter than the cylindrical outer surface 12 of the workpiece 11. A plurality of clamping arms 24 engage the outer end of the workpiece 11 and are drawn tightly against the workpiece by bolts 25. The vertical surface 20 to which the workholder is attached is a perfectly plane surface and, by the engagement of the end of the workpiece with this surface, the workpiece is arranged with the axis of the bore 13 exactly horizontal.

The toolhead 17 is provided with a shaft 26 mounted in bearings for rotation concentrically of the axis of the workpiece. A passage 27 extends axially through the shaft and, at the end of the shaft away from the workpiece, is connected to a fitting 28 having a passage which extends axially of the shaft 26 and then extends at a right angle. The fitting is connected by an extension 29 to a flexible hose 31, the hose being connected to a source of pressure air (not shown). The outboard end of the shaft 26 is also provided with splines to which is attached a drive wheel 32 formed on its outer periphery with teeth 33 for engagement with a timing belt 34. The timing belt also goes around a wheel 35 keyed to the shaft 36 of a hydraulic motor 37. The motor is connected to a source of pressure fluid (not shown) by means of flexible conduits 38 and 39, the differential pressure between the conduits 38 and 39 being adjustable to regulate the speed of rotation of the motor and, therefore, the speed of rotation of the shaft 26.

Mounted on the inboard end of the shaft 26 is a toolholder 41 having a main body 42 which, in the preferred embodiment, is of a generally cylindrical form and which extends coaxially of the axis of the shaft 26 and of the axis of the workpiece 11. It is provided with a central passage 43 which is connected to the passage 27 through the shaft 26 and from the passage 43 extends branch passages 44 and 45. The branch passage 44 connects to the outer end of a radial bore 46 which extends radially inwardly of the main body 42 and whose outer end is provided with a cover 47. Lying in the bore 46 is a piston 48 having a short rod 49 extending radially inwardly thereof. Opposed to the bore 46 in the main body 42 is a bore 51 provided at its outer end with a cover 52 and operatively connected with the branch passage 45. In the bore 51 resides a piston 53 having a rod 54. The main body 42 is provided with a cylindrical bore 55 which enters the side of the main body facing toward the workpiece 11. In this bore is bolted a generally cylindrical block 56 having a narrow slot 57 formed at one side, the slot being defined by two parallel axial walls between which is slidably carried an arm 58 which is fastened to the block 56 by a pivot pin 59, extending through its central portion. One end of the arm 58 resides close to the rod 49 (extending from the piston 48) and is contacted thereby. Another similar slot 61 is formed in the block 56 and serves to retain and guide an arm 62. A pivot pin 63 extends through the block 56, through the slot 61, and through the intermediate portion of the arm 62. The outbord end of the arm 62 is contacted by the rod 54 extending from the piston 53. A vertical bore 64 extends from the bottom surface of the slot 57 to the corresponding surface of the slot 61 and carries a coil spring 65. The spring extends around on axially-directed pin 66 on the outbord end of the arm 58 immediately opposite the point of contact by the rod 49 and also extends around a pin 67 which extends inwardly from the outboard end of the arm 62 immediately opposite the point of contact by the rod 54.

The inboard end of the arm 58, that is to say, the end lying adjacent the workpiece 11, extends well into the workpiece and carries a mounting arm 68. The arm 68 extends radially of the workpiece and at its inner end is hingedly attached to the arm 58 by means of a pivot pin 69. At its outer end is fastened a tool such as a honing stone 71. In a similar way, the inboard end of the arm 62 is provided with a mounting arm 72 pivotally attached to it by means of a pivot pin 73; at its inner end the mounting arm 72 is provided with a tool such as a honing stone 74. Both stones 71 and 74 are formed exactly to fit the groove or annular surface 14 formed in the inner surface of the ball bearing race or workpiece 11. Both stones are provided with operative surfaces which are in the geometric form of a crowned section of a circular annulus. It will be understood that, if the stone were formed in a perfect circular annulus, there would be interference with the surface of the groove, if the stone were rocked. For that reason, the ends are crowned to avoid interference. A horizontal plane passing through the axis of the workpiece in the central plane of the arm 68 will intersect the operative surface of the stones 71 and 74 on a circular segment. Similarly, a plane at a right angle to the axis of the workpiece at the center portion of the stone will also intersect a circular segment on the surface of the stone. However, planes taken at other points will intersect curves of non-circular form.

The operation of the apparatus and the practice of the method will now be readily understood in view of the above description. First of all, the workpiece 11 is locked in place relative to the base 16 by placing it within the bore 23 of the workholder 22 and tightening the bolts 25 to press the clamping arms 24 against the outboard end of the workpiece. This serves to press the inboard end against the flat vertical surface 20 of the workhead 15. The workpiece is, therefore, securely held in place. Because the bore 23 is only slightly larger than the outer surface 12 of the workpiece, successive workpieces will be locked in place with their axes coincidental. It should be noted that holding the workpiece in the workholder 22 in this manner produces no pressure radially of the workpiece but only axially in which direction it is not subject to distortion. This means that there is no distortion of the annular surface 14 which is to be finished. In this condition no pressure air enters the system through the conduit 31. As a matter of fact, before the honing operation begins, the valving and air source (which is not shown) are so conditioned that the conduit 31 and the connected elements are connected to atmospheric pressure. Therefore, the spring 65 operates to press the outboard ends of the arms 58 and 62 radially outwardly so that the inner ends carrying the stones 71 and 74 are directed inwardly. This makes it possible to move the toolhead 17 toward the workhead to introduce the ends of the arm into the workpiece. When this has been done, air under pressure is introduced through the conduit 31, it passes through the extension 29, through the passages in the fitting 28, and into the passage 27 of the shaft 26. From there the air pressure passes through the passage 43 and outwardly through the passages 44 and 45 where the pressure enters the outer ends of the bores 46 and 51. The air pressure presses the pistons 48 and 53 radially inwardly so that the rods 49 and 54 contact the outboard ends of the arms 58 and 62, respectively, and press them inwardly. The arms pivot about their pivot pins 59 and 63 and press the inboard ends of the arms 58 and 62 outwardly. This carries the mounting arm 68 and the mounting arm 72 radially outwardly bringing the stones 71 and 74 into contact with the annular surface 14. At the same time, hydraulic fluid passes through the hydraulic motor 37, being introduced into the motor through the conduit 38 and leaving through the conduit 39. The shaft 36 rotates along with the wheel 35 so that the timing belt 34 drives the drive wheel 32 through the medium of the inter-engaging teeth on the belt 34 and on the wheel. This rotates the shaft 26 in its bearings and, at the same time, rotates the toolholder 41 and all associated apparatus. This rotation is transmitted through the arms 58 and 62 to the stones 71 and 74. The stones 71 and 74 press against the annular surface 14 with a pressure determined by the air pressure acting behind the pistons 48 and 53. This, it will be understood, will be at a predetermined value and will regulate the pressure of the honing stones against the surface to be finished. The workpiece 11 remains in a fixed position and the stones rotate about the axis of the workpiece. At the same time, the shaft 18 rotates carrying with it its cam 19. The cam 19 is slightly eccentric and, therefore, causes a reciprocatory movement of the toolhead 17 relative to the base 16; a similar reciprocatory action takes place in the arms 58 and 62. As these arms reciprocate, they also reciprocate the pivot pins 69 and 73 by which the inboard ends of the arms are attached, respectively, to the mounting arms 68 and 72. The stones 71 and 74, however, are locked in place by their engagement with the groove 14 so that, as the toolhead 17, the toolholder 41, and the arms 58 and 62 reciprocate back and forth at a high rate of speed, the mounting arms 68 and 72 rotate slightly about the center of curvature or minor axis of the annular surface 14. The net effect is that the stone occupy different relationships to the surface to be finished, thus producing a much smoother and geometrically correct surface.

It can be seen, then, that the honing of the annular surface 14 takes place efficiently and effectively for a number of reasons. First of all, the workpiece is held in a fixed position in a simple workholder which does not subject the workpiece to a radial compression which would otherwise distort the workpiece and produce an annular surface 14 which would not be geometrically correct after the workpiece had been released from the distorting members. At the same time, the workpiece is not mounted on a member which is provided with bearings that can run eccentrically relative to the center of rotation of the stones. The pressure of the stones can be very readily controlled by controlling the air pressure operating on the pistons 48 and 53 and the nutation of the stones relative to the surface to be finished produces in the well-known manner according to the theory of probability a geometrically correct surface, irrespective of minor discontinuities in the surface of the stone, as normally take place during any kind of an abrasive action.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for honing an annular surface of a workpiece, the annular surface having a major and a minor axis, comprising
 (a) a fixed workhead having means for holding the workpiece in a fixed position without distortion of the said annular surface,
 (b) a toolhead mounted adjacent the workhead and having a spindle which is subject to rotation about and to reciprocation substantially along the major axis of the said surface, and (c) a toolholder mounted on the spindle for movement therewith, the toolholder including a tool, including means for pressing the tool against the surface with a constant predetermined pressure, and including means for rocking the tool through a small angle as the said reciprocation takes place.

2. Apparatus as recited in claim 1, wherein the toolholder includes an elongated arm extending parallel to the said major axis and pivoted intermediate of its length about an axis perpendicular to and spaced from the said major axis, one end of the arm lying adjacent the surface, a mounting arm pivotally attached to the said one end of the elongated arm and extending radially toward the surface, the tool being attached to the mounting arm for pivotal movement therewith as the toolholder and the elongated arm reciprocate parallel to the said major axis.

3. Apparatus as recited in claim 2, wherein a pneumatic cylinder is mounted in the toolholder and engages the other end of the elongated arm on occasion to press the tool against the surface with the said predetermined pressure.

4. Apparatus as recited in claim 3, wherein a spring is mounted in the toolholder and engages the other end of the elongated arm to move the tool away from the surface when the pneumatic cylinder is inoperative.

References Cited by the Examiner
UNITED STATES PATENTS

| | | | |
|---|---|---|---|
| 1,269,808 | 6/18 | Gray et al. | 51—291 |
| 1,569,940 | 1/26 | Anthony | 51—33 |
| 2,141,491 | 12/28 | Searles | 51—105 |
| 2,206,842 | 7/40 | Indge | 51—33 |
| 3,005,297 | 10/61 | Spicacci | 51—291 |

LESTER M. SWINGLE, *Primary Examiner.*